Figure 1:
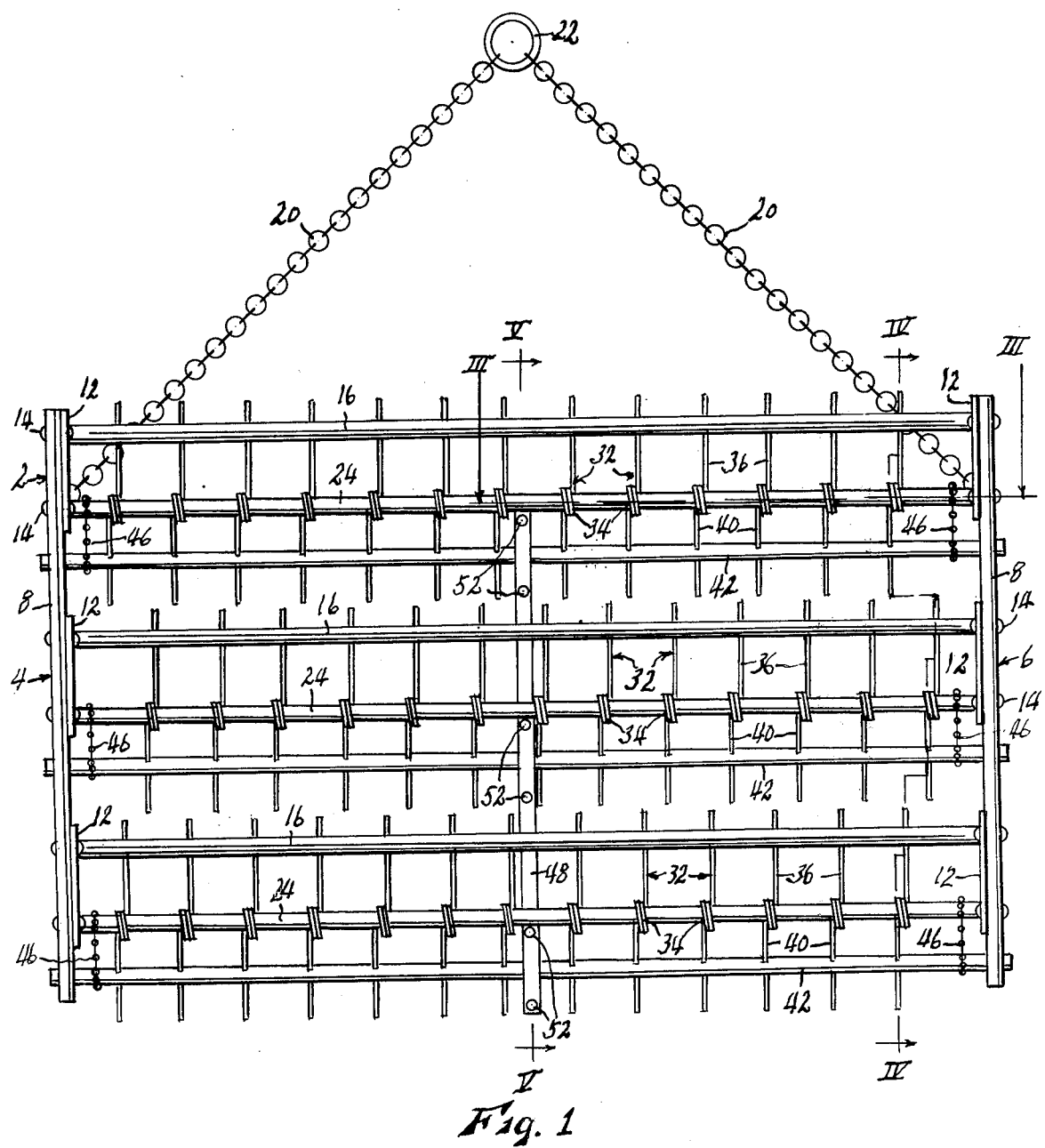

United States Patent [19]

Duckworth

[11] 4,330,042
[45] May 18, 1982

[54] THATCH LOOSENING RAKE

[76] Inventor: Lawrence L. Duckworth, 7510 Maple La., Raytown, Mo. 64138

[21] Appl. No.: 236,594

[22] Filed: Feb. 20, 1981

[51] Int. Cl.³ .............................................. A01B 31/00
[52] U.S. Cl. .................................... 172/621; 56/400; 172/643
[58] Field of Search .............................. 172/619–622, 172/643, 710; 56/16.1, 395, 400

[56] References Cited

U.S. PATENT DOCUMENTS

| | | | |
|---|---|---|---|
| 689,595 | 12/1901 | Lindgren | 172/621 |
| 711,956 | 10/1902 | Furthmiller | 172/622 |
| 835,879 | 11/1906 | Bowman | 172/622 |
| 2,333,586 | 11/1943 | Rude | 172/622 |
| 3,765,159 | 10/1973 | Neff | 172/622 |
| 4,151,701 | 5/1979 | Marto | 56/400 |
| 4,256,185 | 3/1981 | Duckworth | 172/621 |

FOREIGN PATENT DOCUMENTS 2055532 3/1981 United Kingdom ............... 172/622

Primary Examiner—Paul J. Hirsch

[57] ABSTRACT

A thatch rake consisting of a frame carrying a multiplicity of downwardly projecting spring teeth dragging the ground and supporting the frame, said teeth being biased forwardly and downwardly but sprung rearwardly by forward motion of the frame, each tooth having a stop member intermediate its ends engageable with the frame after partial springing thereof to reduce its effective length so that portion between the stop and its free end, so as to increase its effective stiffness, and being so supported as to provide a pronounced downward movement thereof if allowed by ground contour to recover forwardly, so as to be enabled to follow uneven ground contours accurately, all of the teeth being connected loosely to allow only limited relative forward and rearward movement thereof, so as to prevent possible bouncing or "leapfrogging" movements of the rake.

7 Claims, 5 Drawing Figures

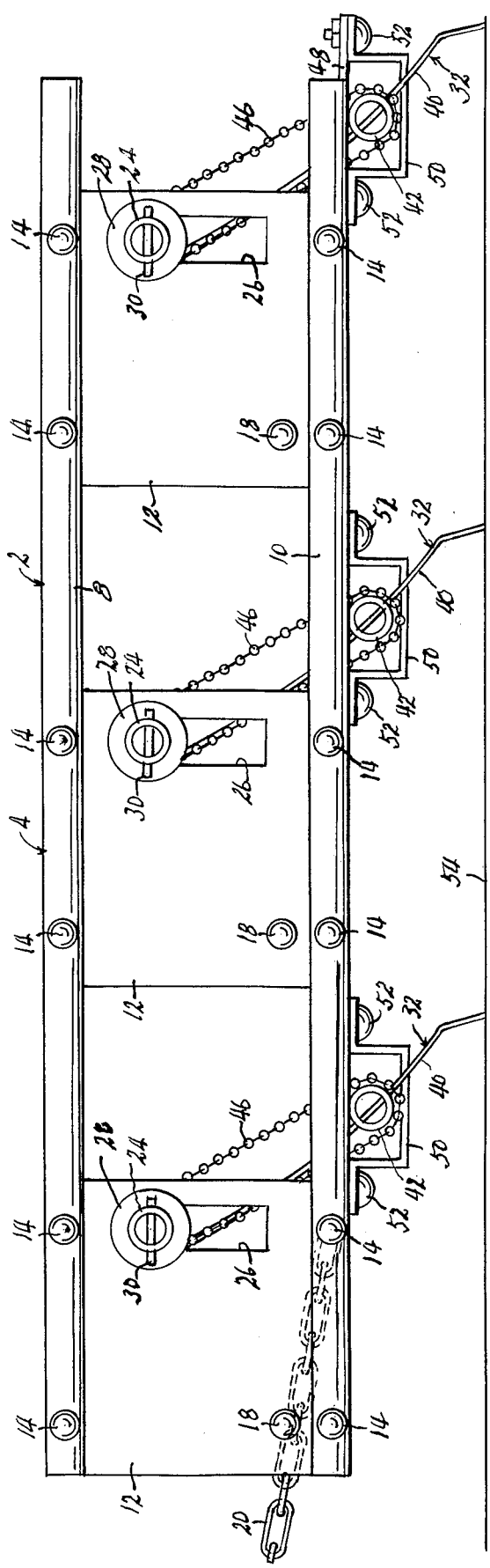
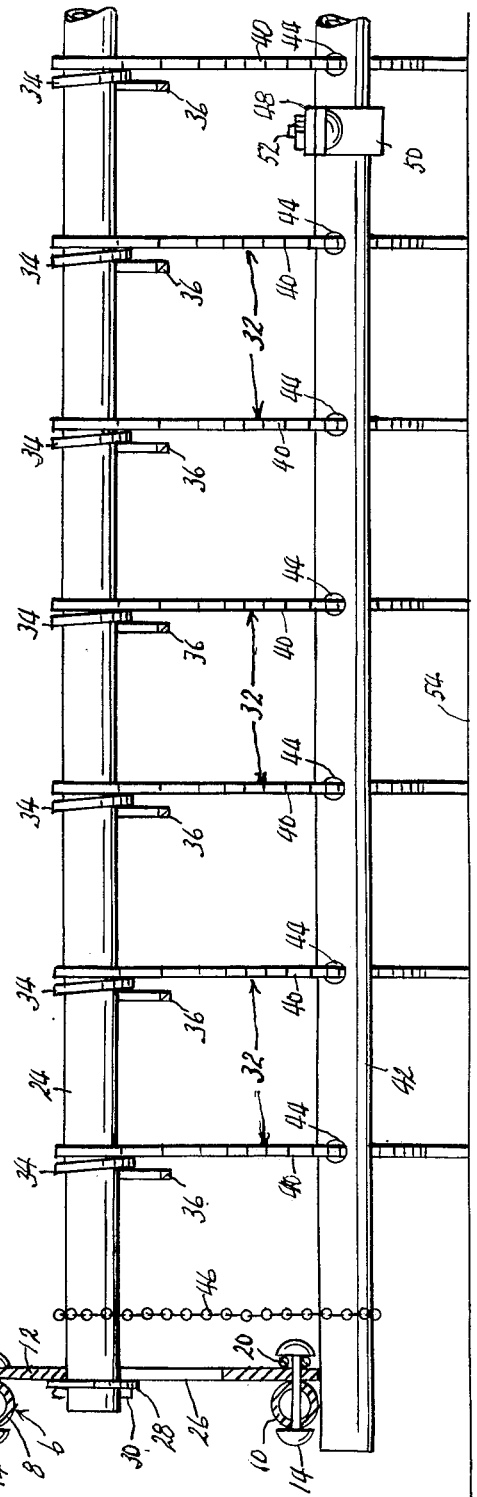
Fig. 2
Fig. 3

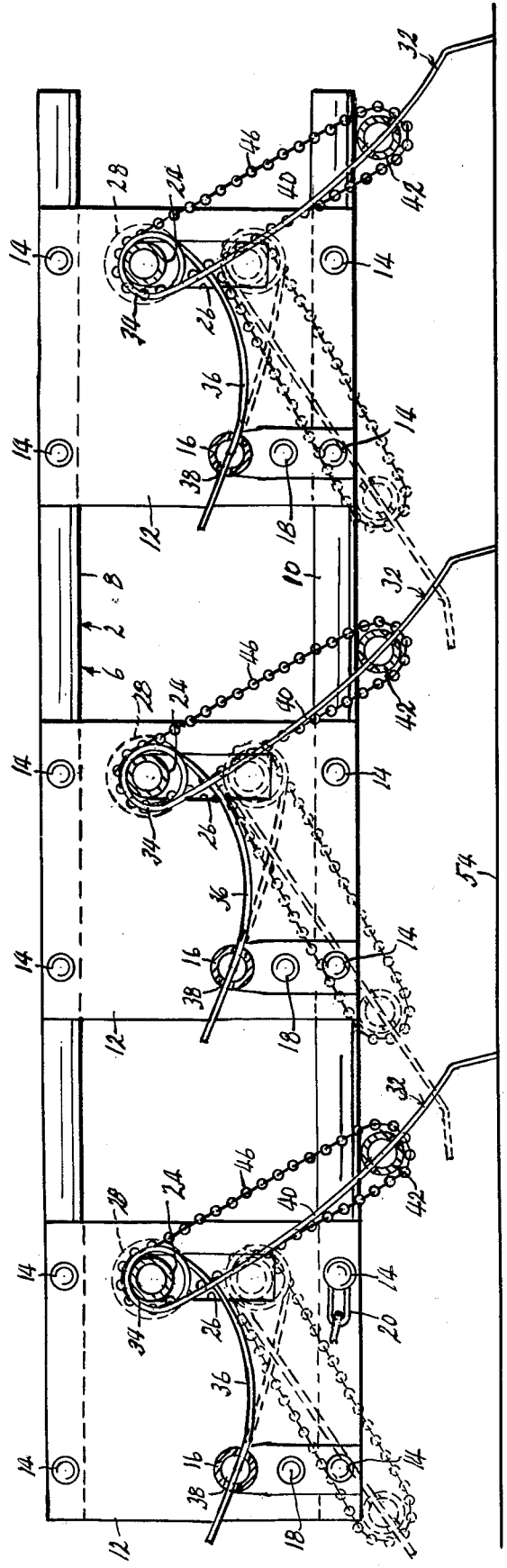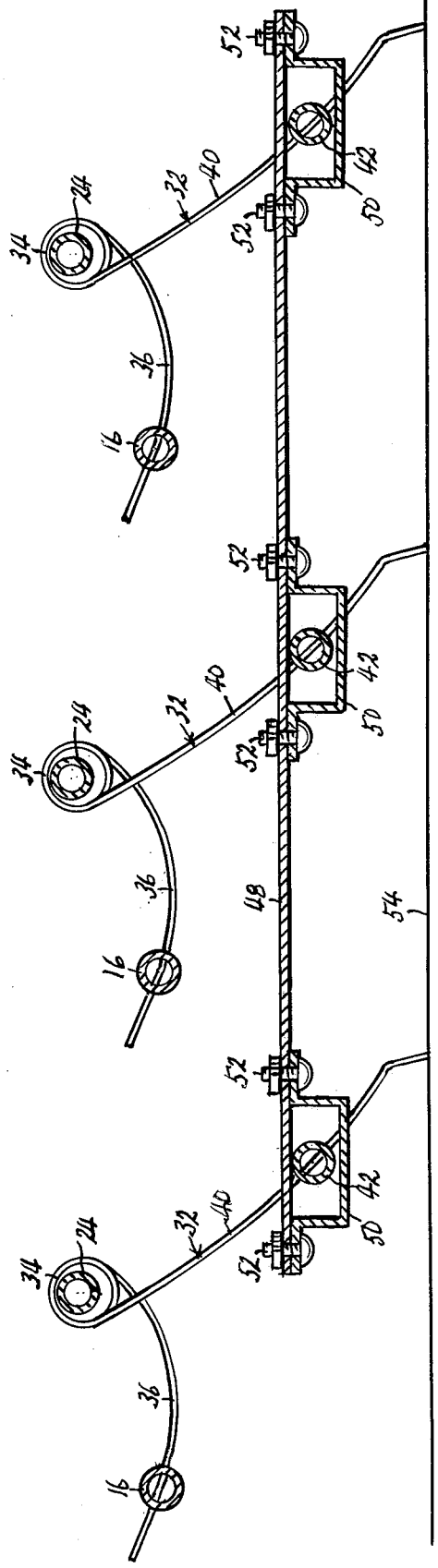

THATCH LOOSENING RAKE

This invention relates to new and useful improvements in lawn rakes, and has particular reference to a rake especially suited for loosening any thatch layer which has been allowed to accumulate on a lawn. It is an improvement on the rake disclosed in my pending application Ser. No. 88,769, filed Oct. 29, 1979 now U.S. Pat. No. 4,256,185.

The mulching of a lawn, by allowing a layer of old grass cuttings, crumbled leaves or the like to accumulate, or by applying a compost thereto, is of course generally beneficial to the lawn, and is often used to reduce surface evaporation of moisture, reduce erosion of the soil, assist in controlling weed growth, and by its decomposition to enrich the soil. However, if allowed to accumulate to too great an extent, it can also reduce and stifle the growth of new grass, since it tends to form a mat, or "thatch", often quite dense, directly against the ground at the base of the grass, which new grass cannot easily penetrate. Hence it is desirable to loosen said thatch, and usually also to remove all or a portion of it, periodically whenever it becomes too dense or accumulates to an excessive thickness. The provision of a lawn rake especially adapted for this thatch loosening function was the primary object of my prior copending application, and the present application relates to improvements therein. The rakes do not collect the loosened thatch in piles, in the manner of a conventional rake, but loosens it and raises it, leaving most of it supported at the upper ends of the standing grass, so that its lawn stifling effect is alleviated, and where it may, if desired, be collected and removed by conventional rakes, lawn vacum cleaners, or the like.

The details of the rake shown in my prior application are duplicated in the present rake, and may be more fully understood by reference to said prior application. In general, it consisted of a frame adapted to be pulled forwardly over the ground by a lawn tractor or other suitable towing vehicle, and a multiplicity of very slender, downwardly projecting spring teeth mounted in the frame, engaging the ground at their lower ends to support the frame. The teeth are very slender to insure penetration of the thatch thereby, and are flexed upwardly and rearwardly by the weight of the frame as they drag over the ground. If they encounter a depression in the ground, due to irregular ground contour, they may flex forwardly and downwardly to follow the ground contour accurately and the teeth were specially mounted and guided to multiply the available downward movement in such instances, in order to follow still greater irregularities of ground contour. This greater vertical movement to follow irregularities required teeth which were longer and more flexible than would be required in normal operation on smooth ground, so special means were provided for shortening the effective length of the teeth in such normal operation, for greater stiffness.

This prior rake functioned properly and efficiently when towed at low speeds, but a definite difficulty arose when it was towed at higher speeds. The teeth, if allowed to recover forwardly and downwardly to follow declevities, might pass a lowermost "dead center" position, and then snap forwardly and upwardly. The teeth were arranged in rows or ranks extending transversely of the frame, with all of the teeth of each row being connected to move generally concurrently, but with the teeth of the respective rows being independently movable. If one rank of teeth, generally the front rank, was allowed to pass under the dead center position, it might in so doing, toss or throw the forward end of the frame upwardly to some degree. Or, if allowed to snap to the forward limit of their travel, the forward end of the frame would drop by gravity so that the points of the front rank of teeth would again dig into the ground, and be dragged rearwardly by forward motion of the frame, first downwardly to the dead center position, and then upwardly. In passing under the dead center position, they would again throw or toss the forward end of the frame upwardly. In either case, at higher towing speeds, it was found that the upward movement of the forward end of the frame occasioned by the passing of the front rank of teeth past their dead center positions was often so great as to allow the next rearward rank of teeth to snap forwardly past their dead center positions, and in turn the teeth of the third rank of teeth. The end result was a vertical "bouncing" movement of the frame, during which the teeth contacted the ground only intermittently. The bouncing movement was usually accompanied with a front-to-rear seesawing motion, much the same as that of a bucking horse. For convenience, I have elected to term the bouncing and rocking motion as "leapfrogging". Obviously the rake cannot perform its thatch loosening function effectively during such movement, and with the prior rake the only solution was to tow the rake at low speeds. The primary object of the present invention, accordingly, is the provision of means for preventing any such leapfrogging motion of the frame.

Generally, this object is accomplished by linking the teeth of the respective ranks of teeth together with a lost motion connection, so that to some degree, all of the teeth of all of the ranks are constrained to move in unison. The lost motion permitted is sufficiently great that the teeth of the respective ranks are still free to follow irregularities of ground contour independently to a large measure, but on the other hand sufficiently small that so long as the teeth of any rank have actual ground contact, it will restrain the teeth of any rank which actually clear the ground, due to declevities in the ground, from passing forwardly past their dead center positions. While as stated the problem may sound intricate, the solution is simple, involving only the addition of a stabilizer bar having a lost motion connection with each of the bars connecting the teeth of the successive ranks of teeth.

Other objects are simplicity and economy of structure, and efficiency and dependability of operation.

With these objects in view, as well as other objects which will appear in the course of the specification, reference will be had to the accompanying drawing, wherein:

FIG. 1 is a top plan view of a thatch rake embodying the present invention, shown in operative position.

FIG. 2 is an enlarged, fragmentary side elevational view of the rake as shown in FIG. 1, FIG. 3 is an enlarged, fragmentary sectional view taken on line III—III of FIG. 1, with parts left in elevation, FIG. 4 is an enlarged, sectional view taken on line IV—IV of FIG. 1, and indicating the rest position of the teeth in dotted lines, and FIG. 5 is an enlarged sectional view taken on line V—V of FIG. 1.

Like reference numerals apply to similar parts throughout the several views, and the numeral 2 applies generally to the frame of a rake embodying the present invention. Said frame includes a pair of vertical side walls 4 and 6 each comprising upper and lower parallel tubular bars 8 and 10 extending from front to rear and rigidly connected by a plurality of vertical plates 12 (three shown) which are regularly spaced apart from front to rear of the frame, and which are affixed at their upper and lower edges respectively to bars 8 and 10 by rivets 14. The frame also includes a series (three shown) of horizontal tooth mounting bars 16 extending laterally between side walls 4 and 6, each connecting a corresponding pair of plates 12 adjacent the forward edges of said plates. As shown, the end portions of each bar 16, which is tubular, are flattened, turned downwardly, and affixed to the associated plates 12 by rivets 18 and certain of rivets 14. The frame is thereby rendered unitary and rigid. A chain 20 is secured to each of the foremost plates 12 of side walls 4 and 6, as by one of rivets 14. Said chains converge forwardly for connection to a ring 22, which may be connected to a lawn and garden tractor to draw frame 12 forwardly, which is an upward direction as viewed in FIG. 1. As will appear, frame 2 must be of substantial weight, and its weight may be increased as required in any suitable manner.

Spaced rearwardly from each mounting bar 16, and parallel therewith though extending between the same pair of side wall plates 12 to which its associated bar 16 is affixed, there is disposed a tooth carrier bar 24. Bar 24 is of sufficient length to pass at each end through a vertically elongated slot 26 formed in the associated plate 12, and is laterally slidable, in a vertical direction, within said slots. A washer 28 (see FIGS. 2 and 3) encircling said bar at the exterior surface of each plate 12, and secured by a cotter pin 30, maintains the bar in assembly with the frame.

Each carrier bar 24 carries a series of rake teeth 32 in regularly spaced relation therealong. Each of said teeth comprises a single elongated length of very slender spring steel, a central portion thereof being coiled helically but loosely around bar 24, the coil 34 being of somewhat larger internal diameter than bar 24, and two end portions projecting outwardly from said coil. One of these end portions constitutes a spring arm 36 which extends generally forwardly and is effectively affixed at its forward end to the associated mounting bar 16, as by being inserted through a hole formed therefor transversely in said bar, as indicated at 38. The other end portion of the coil constitutes a spring arm 40 which extends generally downwardly, and which is of sufficient length to extend well below the bottom plane of frame 2, even if carrier bar 24 is disposed at the upper ends of its slots 26, and even if it is also inclined sharply forwardly or rearwardly from bar 24.

A stop bar 42 is associated with each carrier bar 24, the stop bar extending horizontally beneath the frame in parallel relation to the carrier bar, and being of sufficient length to underlie the lower bars 10 of the frame side walls 4 and 6. The stop bar is transversely drilled at intervals along its length corresponding to the spacing between spring arms 40 of the teeth carried by its associated carrier bar, whereby to form holes 44 through which said spring arms extend in slidable relation thereto. The stop bar is disposed in spaced relation from the free lower ends of spring arms 40, the projecting portions of said arms constituting the effective operating portions of the rake teeth. The stop bar is maintained at a minimum spacing from the free lower ends of the teeth, and at a maximum spacing from the associated carrier bar, by chain loops 46 engaged about each carrier bar and its associated stop bar, adjacent each of the ends thereof adjacent side walls 4 and 6. Otherwise, the stop bar is free to move slidably along the teeth which pierce it. The elongated spring elements forming the teeth are pretensioned to bias carrier bars 24 downwardly in slots 26 at all times, and to bias arms 40 thereof forwardly and upwardly to press stop bars 42 upwardly against the lower edges of side walls 4 and 6, as shown in dotted lines in FIG. 4. A stabilizer bar 48 extends forwardly and rearwardly at the midpoints of stop bars 42, resting by gravity on said stop bars, and secured loosely to each of said stop bars by a U-shaped keeper member 50. Said keeper member, together with bar 48, forms a loop enclosing the stop bar, and each end of the keeper is secured to the stabilizer bar by a bolt 52. As best shown in FIG. 5, each keeper is elongated in a direction parallel to the stabilizer bar, whereby to permit a limited degree of free lost motion of said stabilizer bar relative to stop bars 42.

In operation, though the teeth normally assume the dotted line position shown in FIG. 4 when the rake is at rest, it will be seen that when the frame is drawn forwardly by chains 20, the teeth will be pivoted rearwardly, first arcing downwardly, past a dead center position below carrier bars 24, and then upwardly, by the fact that the points of the teeth either dig into the ground surface 54, or drag therealong with substantial resistance to forward movement, to the position shown in solid lines, wherein stop bar 42 again abuts the lower edges of the frame side walls, but at a position substantially rearwardly from their original positions, and each rearwardly from its associated carrier bar 24. During this pivotal movement, and as the points of the teeth pass their dead center positions under their carrier bars 24, the weight of frame 2 presses slots 26 of plates 12 downwardly over the carrier bar until it is disposed in the upper ends of said slots, as shown in solid lines in FIG. 4, thereby flexing and applying additional tension to spring arms 36. The weight of the frame should be adequate for this purpose. During the remainder of the movement, until stop bar 42 again engages the frame, spring arms 40 are flexed upwardly and rearwardly. The parts then have the positions shown in solid lines in FIG. 4, and as the device is drawn forwardly by chains 20, the teeth will perform their intended function of loosening the thatch. Actually, unless the thatch is very heavy, the rake will not push the thatch ahead of the teeth in piles, due to the slenderness and wide spacing of the teeth. Instead, the thatch will be loosened, separated from the ground at the base of the grass, lifted through the grass, and then pass between the teeth, to be left lying for the most part at the tops of the standing grass blades. This may be all that is desired, since the loosening and lifting of the thatch permits the soil to "breathe", relieving it of the possibly stifling and grass-growth inhibiting effect of the thatch. However, if complete removal of the thatch is desired, the loosening and lifting performed by the present rake renders the thatch capable of being gathered for disposal by more conventional rakes, or by lawn vacuum cleaners or the like. Such devices are largely ineffective in gathering thatch which has become matted on the ground at the base of the grass.

With the parts in the solid line position of FIG. 4, the effective length of the teeth constitutes only those portions thereof between stop bar 42 and their free lower ends, rather than their full lengths from mounting bars 16 to their free ends. This shortened effective length, as provided by the top bars, in effect stiffens the free end portions of the teeth, permitting frame 2 to be heavier than it could be if the stop bars were not used and the teeth were free to yield along their entire lengths, and hence permits a downward pressure on the teeth sufficient to insure that they will always penetrate the thatch to drag directly on the ground beneath the thatch. Nevertheless, yieldability of the teeth along their entire lengths is useful for another purpose, as will be described.

When in the solid line FIG. 4 position, the weight of frame 2 of course also flexes the portions of the teeth below bar 42, as shown. Therefore, if any tooth traverses a slight declivity in the ground surface, while other teeth remain supported on higher ground, that tooth will recover resiliently, moving its tip in a downward and forward direction to follow the declivity. However, since the free end portions of the teeth are short, and the downward movement of the tooth tips by this recovery is small, this provision in itself provides that the teeth will follow the ground surface accurately only on surfaces having only slight irregularities, while actual lawns often have much greater irregularities of contour. With the present rake, if one set of teeth, that is those mounted on one carrier bar 16, traverse a declivity sufficiently deep that resilient recovery of their free end portions does not extend their tips to engage the ground within the declivity, then spring arms 40 of the teeth begin to straighten by their own resilience, moving stop bar 42 downwardly and forwardly out of contact with the frame. This recovery of the entire lengths of arms 40, rather than merely the free end portions thereof, greatly increases the vertically downward movement of the tooth tips provided by the recovery, and hence permits the tooth tips to follow accurately the ground contour in much deeper surface declevities. The available vertical movement of the tooth tips is further multiplied by the arrangement of carrier bars 24. When spring arms 40 recover resiliently and therefore tend to relax, spring arms 36 also tend to recover resiliently, and hence force carrier bar 24 downwardly in frame slots 26, by reason of the engagement of coils 34 about said carrier bar. The movement of the carrier bar is constrained to vertical by its guidance in slots 26. Any binding of the bar in the slots is prevented by the fact that coil 34 is of slightly larger diameter than the bar. Thus the downward movement of the tooth tips when spring arms 40 spring forwardly to lower stop bar 42 from the frame is multiplied not only by the fact that the full length of said arm then comes into play; as previously described, but also by the fact that the entire spring arm 40 is also lowered bodily by the downward movement of bar 24 in slots 26. Hence the teeth of one set can accurately follow the ground contour of quite deep declevities, even when the teeth of other sets are supported at higher levels. Stop bars 42 are preferably mounted loosely on spring arms 40, as shown, in order not to impede or interfere with full length flexing of said arms, and to permit some degree of independent movement of even directly adjacent teeth. This loose mounting necessitates the use of chain loops 46 to preserve the proper positioning of the bar on the spring arms.

The operation thus far described is that of the rake shown in my prior copending application above referred to, and while effective and efficient at low towing speeds of the rake, a definite difficulty was found to develop at higher towing speeds. As previously discussed, it was found that at higher speeds, if one rank of teeth, usually those carried by the front mounting bar 16, were allowed by a ground irregularity to snap forwardly past their dead center positions under their associated carrier bar 24, this forward motion past dead center, or the subsequent rearward motion past dead center when the then forwardly projecting teeth again fell to the ground and the teeth again flexed rearwardly by forward motion of the frame, often flipped or tossed the forward end of the frame so high that the next rearward rank of teeth were also allowed to snap forwardly past dead center, and then in like manner the rearmost rank of teeth. The end result was that the entire rake could be set in a bouncing motion, clearing the ground entirely at the upper portions of the vertical motions. This condition, which often could be halted only by slowing the towing speed radically, of course greatly impaired the efficiency of the rake by rendering its ground coverage intermittent and spotty, and also reduced the ground area it could cover in a given time period by requiring a low towing speed. This motion is what I have termed "leapfrogging".

The present invention solves this problem by effectively preventing any of the teeth from moving forwardly past their dead center positions under normal operating conditions. This is accomplished by connecting all of the teeth of the rake in such a manner that so long as a substantial number of them are riding in normal contact with the ground, the remainder of the teeth are prevented from moving forwardly past dead center even if they should clear the ground completely due to a declevity in the ground surface. The tooth connecting means for this purpose includes stop bars 42, each of which constrains all of the teeth of the rank of teeth joined thereby to movement substantially in unison, and stabilizer bar 48 with its keepers 50, which loosely connect the stop bars 42 of all of the ranks of teeth. This limitation of tooth movement is accomplished, moreover, without interferring materially with the independent movement of the teeth, and ranks of teeth, to follow localized irregularities of ground contour.

If the front rank of teeth enter into a ground declevity, the front stop bar 42 will move forwardly to engage the forward end of its keeper 50, and then pull the stop bar 48 forwardly to engage the second and third stop bars in the rearward ends of their keepers 50, but forward movement of the front stop bar is then arrested by the stabilizer bar, so long as the rearward ranks of teeth still have engagement with the ground. At this time, as will be seen by a consideration of FIG. 5, the front rank of teeth will still not have moved forwardly to their dead center positions directly below front carrier bar 24, and can move no further in a forward direction, even though they may be completely out of contact with the ground, since they are restrained by the stabilizer bar. By the time the second rank of teeth encounter the same declevity, the front rank of teeth will again have normal ground contact, and the stabilizer bar will restrain the second rank of teeth against forward movement past dead center, and so on to the rear rank of teeth. Larger ground declevities, which may span two or more ranks of teeth, do not require the stabilizer bar since the rake may follow them by gravity. It is required only when a declevity is so short that one rank of teeth may be lifted out of ground contact by virtue of the fact that the frame is supported by engagement of other ranks of teeth on higher ground. Moreover, the stabilizer bar does not materially reduce the ability of the respective ranks of teeth to follow ground declevities independently. The front-to-rear clearance of stop bars 42 in keepers 50 is such that when the forward movement of any stop bar is arrested, it is so positioned that the teeth guided thereby will have moved forwardly to a point closely approaching their dead center positions, so that they have nearly the total downward projection which they would have even if the stabilizer bar were not used at all. Vertical clearance of stop bars 42 in keepers 50 may be minimal. Forward movement of the stop bars in their keepers is accomodated by downward sliding movement of spring arms 40 of the teeth in holes 44 of the stop bars.

While I have shown and described a specific embodiment of my invention, it will be readily apparent that many minor changes of structure and operation could be made without departing from the spirit of the invention.

What I claim as new and desire to protect by Letters Patent is:

1. A thatch loosening rake comprising:
  a. a frame having a substantial horizontal area and adapted to be drawn over the ground,
  b. a large number of slender, elongated resilient teeth distributed over the area of said frame,
  c. mounting means securing the upper ends of said teeth in said frame, said teeth extendng at all times below the lower plane of said frame to engage the ground to support said frame above ground level, and being biased normally to project downwardly and forwardly, the weight of said frame being sufficiently great that when
  said frame is moved forwardly, the resistance to forward travel of the lower ends of said teeth over the ground will cause said teeth to be pivoted first downwardly and rearwardly to a dead center position in which they have a maximum downward projection, and then upwardly and rearwardly to a normal use position, and
  d. connecting means joining all of said teeth and operable, so long as any substantial number of teeth are disposed in said use position, to limit forward motion of the remainder of the teeth to such an extent that they cannot move forwardly past their dead center positions even when the lower ends thereof are not in engagement with the ground.

2. A rake as recited in claim 1 wherein said teeth are arranged in a series of ranks extending transversely of said frame, and wherein said connecting means comprises:
  a. a first connecting means joining all of the teeth in each of said ranks of teeth and operable to constrain all of the teeth of that rank to forward and rearward movement substantially in unison, and
  b. a second connecting means joining the teeth of the respective ranks of teeth and operable to constrain the respective ranks of teeth to forward and rearward movement generally in unison.

3. A rake as recited in claim 2 wherein said second connecting means provides a degree of free lost motion between the respective ranks of teeth in a forward and rearward direction, whereby so long as some of said ranks of teeth are held in said use position by engagement with the ground, the teeth of any rank not engaging the ground are permitted to move forwardly only to a position approaching said dead center position.

4. A rake as recited in claim 2 wherein said first connecting means for each rank of teeth comprises a stop bar extending transversely of said frame and connected to each of the teeth of said rank of teeth at its point of intersection therewith, at points spaced below the upper ends of said teeth, and wherein said second connecting means comprises a stabilizer bar extending forwardly and rearwardly of said frame and connected to each of said stop bars at its point of intersection therewith.

5. A rake as recited in claim 4 wherein said connection of said stabilizer bar to each of said stop bars is operable to permit a degree of free lost motion between said stop bar and said stabilizer bar in a front-to-rear direction, whereby so long as the teeth of some of said ranks are held in their use positions by ground contact, the teeth of any rank of teeth not engaging the ground are permitted to move forwardly to a position approaching but not passing said dead center position.

6. A rake as recited in claim 5 wherein said stabilizer bar is unconnected to said frame and has a keeper affixed thereto at each of said stop bars, said keeper enclosing the associated stop bar and being proportioned to permit a limited amount of free front-to-rear motion of said stop bar relative to said stabilizer bar.

7. A rake as recited in claim 6 wherein all of the teeth associated with each of said stop bars project slidably through holes formed therefor transversely in said stop bar, whereby said teeth will not interfere with the forward and rearward movement of said stop bar in its associated keeper.

* * * * *